Figure 1:
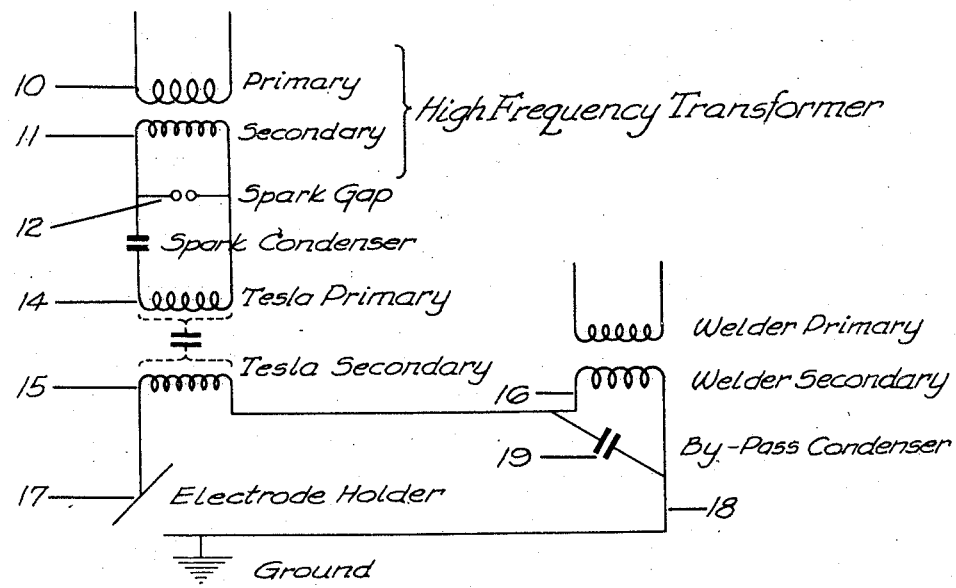

Patented Feb. 19, 1946

2,395,062

UNITED STATES PATENT OFFICE 2,395,062

HIGH-FREQUENCY ARC WELDER

Clayton P. Nielsen, Chicago, Ill., assignor to Mid-States Equipment Company, Chicago, Ill., a corporation of Illinois Application May 23, 1942, Serial No. 444,205

3 Claims. (Cl. 315—163)

This invention has to do with an arc welder, and is particularly directed to superimposing a high frequency current on the regular arc welding current, to assist in starting and maintaining the arc.

Efforts in the past to superimpose a high frequency current on a regular arc welding current, by inexpensive means, especially by the use of a spark gap, have not been successful primarily because of the development of radio interference.

It is recognized that even a relatively poor quality arc welder with a superimposed high frequency current is to be preferred from an operating standpoint, to an expensive or well-built arc welder without high frequency current. In the first place, materials such as aluminum, bronze, stainless steel, bare mild steel and other alloys can be welded with ease when the high frequency current is superimposed. The arc starts easily without the faults known as "picking" or "scratching," and the nerve racking tension known as "operator's fatigue" is practically entirely eliminated.

It is an object of this invention to eliminate the faults above mentioned and to provide the advantages above mentioned. It is a further object to provide a construction in which the arc can be controlled with greater ease and can be started or "struck" with a lighter initial current or heat than would otherwise be practical. In this connection, in the past it has been necessary to select a voltage higher than would ordinarily be necessary for the welding, so as to aid in striking the arc. This resulted in burning the welds and made it impractical to make light gauge or butt welds, especially where there was danger that little additional current heat would cause a hole and spoil the appearance of the arc.

It is an object of the present invention to produce a high frequency current that serves as a "path" for the regular current produced by the welding machine. This will result in accomplishing the object of the use of relatively low heat current for the regular welding arc, which low heat current is necessary for welding of light gauge metals.

Another object is to eliminate most, if not all, of the shocking sensation sometimes produced, particularly if it is desired to change the electrodes or if the operator should lean against the welding table. This is particularly true where he is changing electrodes of the popular coated type used today.

It is another object of the present invention to provide a circuit which is not entirely new, but which has certain elements such as a special Tesla coil and certain other parts, which, in their entirety, result in accomplishing the purposes hereinabove mentioned and particularly result in eliminating for all practical purposes radio interference.

Other objects and advantages of the invention will appear as the nature of the improvements is better understood, the invention consisting substantially in the novel construction, combination and arrangement of parts hereinafter fully described, illustrated in the accompanying drawing, and finally pointed out in the appended claims.

Figure 2:
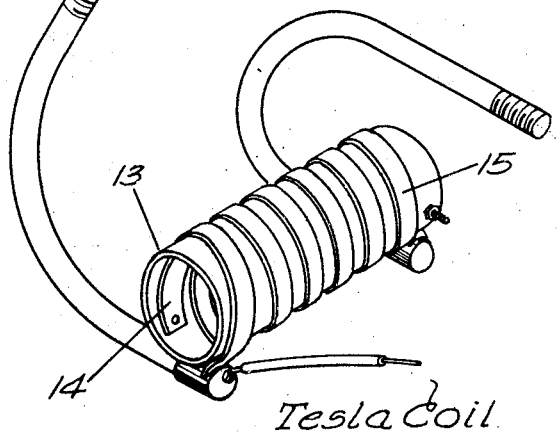

In the drawing:

Figure 1 is a circuit diagram illustrating a preferred embodiment of my present invention; and Figure 2 discloses a preferred form of Tesla coil for use in the circuit arrangement of Figure 1.

Referring more in detail to the arrangement shown in the drawing, I have shown a circuit in Figure 1 which, in its general arrangement, is not new. It is generally similar to a circuit that is used for spectacular stage demonstrations and other uses, particularly where a performer desires to draw long sparks off his fingers. I control the voltage, however, and the high frequency current which cannot normally be felt by a human being and which does not cause shock. I have provided a high frequency transformer having the primary 10, secondary 11, and having a spark gap 12 across the secondary terminals. The secondary terminals of the high frequency transformer are connected to the primary of a specially designed Tesla coil. Between one of the secondary terminals of the transformer, and the Tesla coil, I have provided a spark condenser. The spark condenser is preferably of .003 microfarad capacity and "creates" the high frequency current.

The Tesla coil, more particularly referred to in Figure 2, is of a special construction which I have determined desirable for accomplishing the purposes necessary in this invention. It comprises a dielectric 13 which may be made of "Bakelite" derivatives, but is preferably made of Lucite which has a dielectric consonant of 2.8 or, Vitrone or Trolitul, both of which have a dielectric consonant of 2.6.

In order to secure enough power to give the results desired, I have made the windings of the Tesla coil of wide copper bands. This provides the maximum amount of surface to secure the proper capacity. The dielectric is preferably at least 2 inches in diameter, or larger, and the bands are preferably (although not necessarily) about three-quarters of an inch in width, and with five primary Tesla turns and six secondary Tesla turns. The number of turns between the primary and secondary, together with the capacity of the spark condenser, determine the frequency within limits. The Tesla primary is shown at 14 and the secondary at 15, in Figure 2. In order to better reduce the capacity and to result in elimination of undesirable radio interference, I have wound the Tesla primary in the opposite direction to the Tesla secondary. I have superimposed the high frequency current on the regular arc welding current, but I have provided an arrangement which keeps the high frequency current out of the arc welder. As clearly indicated in Figure 1, the Tesla secondary is connected to the lead 16 from the welder secondary to the electrode holder 17. This electrode holder 17 is the regular arc welding electrode.

The other terminal of the welder secondary is connected to the ground lead 18. In order to keep the high frequency current from the welder, I have provided a by-pass condenser 19. The high frequency current, because of the resistance of the welder secondary turns will not enter the welder, but will be by-passed by the protective by-pass condenser 19. This by-pass condenser 19 is preferably of two or more microfarads capacity, although one microfarad will ordinarily work. A small by-pass condenser ordinarily will not allow high frequency current to pass to sufficiently ionize the gap and thus cause the full welding current to pass across the arc without the aid of an additional ionizing agent. This is particularly valuable when a bare rod is used as the electrode, and a greater than two microfarad capacity is much preferred. I have found that a five microfarad capacity is a desirable size.

The use of wire for the primary and secondary Tesla is not satisfactory, but if the high frequency transformer is sufficiently large, it is possible that a Tesla coil could be wound with wire, which would not give radio interference in any marked degree. However, the additional expense and other disadvantages would be present. It is noted that a smaller than a two microfarad capacity by-pass condenser could be used but in such case, a non-inductive condenser, preferably mica, would be desirable. This is more expensive than the ordinary condenser.

It is understood that the said arrangement may be incorporated into a separate unit which can be attached to welders now on the market, by a simple operation. Likewise, it may be built into a regular welding unit as part of the initial construction or in addition thereto.

The form of the invention herein shown and described presents a preferred embodiment thereof, and delineates its adaptation to practical use, but it is to be understood that the present disclosure is to be considered from the illustrative standpoint and not as imposing restriction or limitation on the invention.

While I have herein shown and described certain features of my invention, still I do not wish to limit myself thereto, except as I may do so in the claims.

I claim:

1. In a device of the class described wherein there is a regular arc welding circuit including a welding transformer having a primary and a secondary, connections from a source of welding current to said primary and connections to a welding electrode and to a ground from said welding transformer secondary, those improvements wherein there is impressed on the welding circuit a high frequency from a circuit whose components include a high frequency transformer having connections to its primary from a source of current, a Tesla coil of special construction having connections to the secondary of the high-frequency transformer, the primary and secondary of said Telsa coil being bands of copper of approximately three-fourths inch in width, and with said Telsa primary and secondary being wound in opposite directions upon a dielectric of at least two inches in diameter, the Telsa primary having five turns and the Telsa secondary having six turns, whereby the frequency is higher than the broadcast band normally used in radio, the size of the copper bands resulting in a maximum amount of surface whereby the capacity is sufficient for welding, the winding of the Telsa primary and secondary in separate directions resulting in a reduction in radio interference, a spark gap across the connections leading from the secondary of the high frequency transformer, a spark condenser of approximately .003 microfarad capacity in one con-connection from the high frequency transformer secondary to the primary of the Tesla coil, and a by-pass condenser of at least two microfarad capacity across the connections from the welding transformer secondary to the welding electrode and to the ground, respectively, and between the Tesla secondary and the welding secondary, whereby said by-pass condenser substantially prevents high frequency current from entering the welding transformer and increases the amount of high frequency current available for the welding operation, substantially as described.

2. In a device of the class described wherein there is a regular arc welding circuit including a welding transformer having a primary and a secondary, connections to a source of welding current to said primary and connections to a welding electrode and to a ground from said welding transformer secondary, those improvements wherein there is impressed on the welding circuit a high frequency from a circuit whose components include a high frequency transformer having connections to its primary from a source of current, a Tesla coil having connections to the secondary of the high frequency transformer, the primary and secondary of said Tesla coil being bands of material of sufficient capacity to carry the welding current, the Tesla primary having not more than ten turns whereby the frequency is higher than the broadcast band normally used in radio, a spark gap across connections leading from the secondary of the high frequency transformer, a spark condenser in one connection from the high frequency transformer secondary to the primary of the Tesla coil, and a by-pass condenser across the connections from from the welding transformer secondary to the welding electrode and to the ground, respectively, and between the Tesla secondary and the welding secondary, whereby said by-pass condenser substantially prevents high frequency current from entering the welding transformer and thereby increases the amount of high frequency current available for the welding operation.

3. In a device of the class described wherein there is a regular arc welding circuit including a welding transformer having a primary and a secondary, connections to a source of welding current to said primary and connections to a welding electrode and to a ground from said welding transformer secondary, those improvements wherein there is impressed on the welding circuit a high frequency from a circuit whose components include a high frequency transformer having connections to its primary from a source of current, a Tesla coil having connections to the secondary of the high frequency transformer, the primary and secondary of said Tesla coil being bands of material of sufficient capacity to carry the welding current, said Tesla primary and secondary being wound in opposite directions, the Tesla primary having not more than ten turns whereby the frequency is higher than the broadcast band normally used in radio, a spark gap across connections leading from the secondary of the high frequency transformer, a spark condenser in one connection from the high frequency transformer secondary to the primary of the Tesla coil and a by-pass condenser across the connections from the welding transformer secondary to the welding electrode and to the ground, respectively, and between the Tesla secondary and the welding secondary, whereby said by-pass condenser substantially prevents high frequency current from entering the welding transformer and thereby increases the amount of high frequency current available for the welding operation.

CLAYTON P. NIELSEN.